March 26, 1963   L. G. CHEATUM ET AL   3,082,798
TYING MECHANISM
Original Filed March 30, 1960   4 Sheets-Sheet 1

INVENTORS
L. G. CHEATUM
C. W. MEINDERS

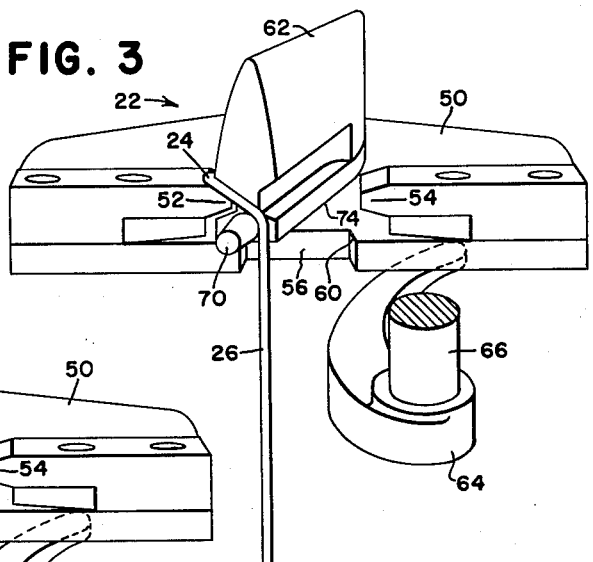
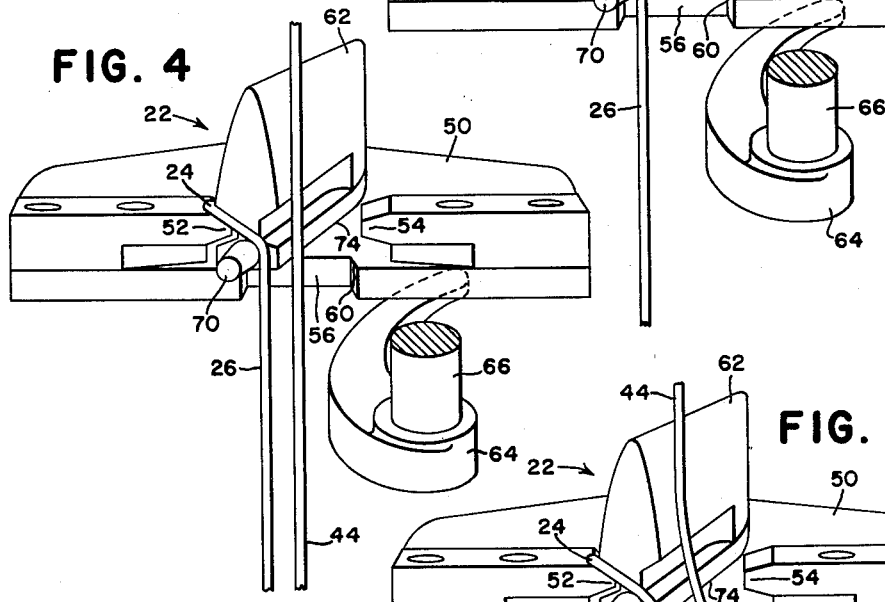
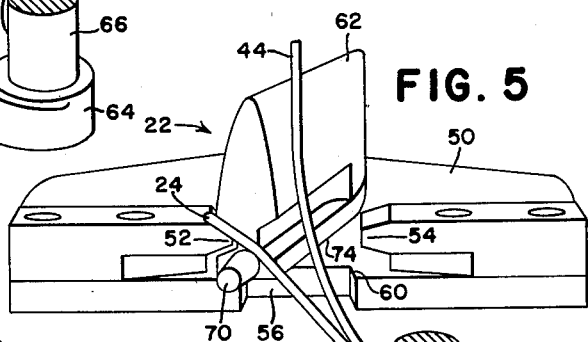
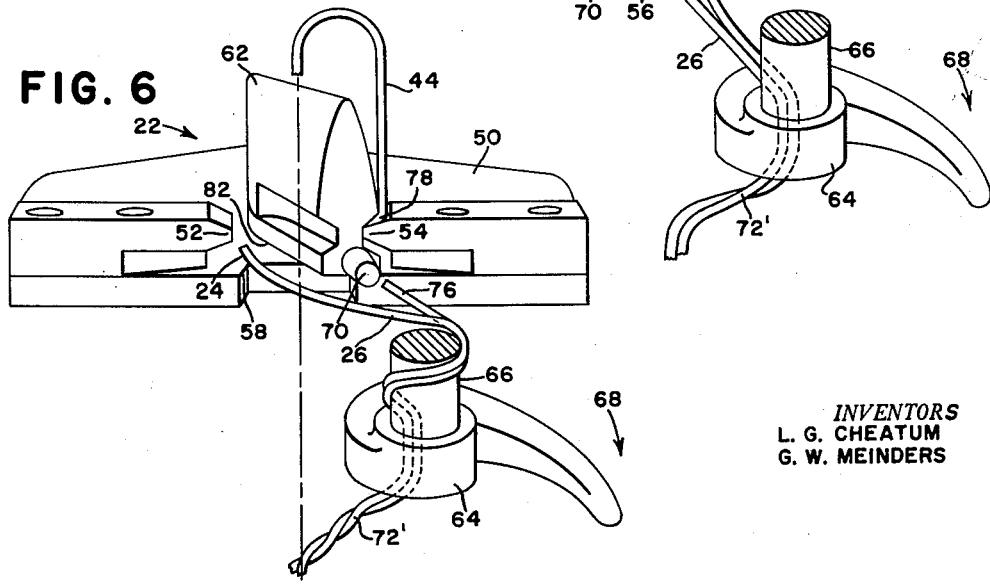

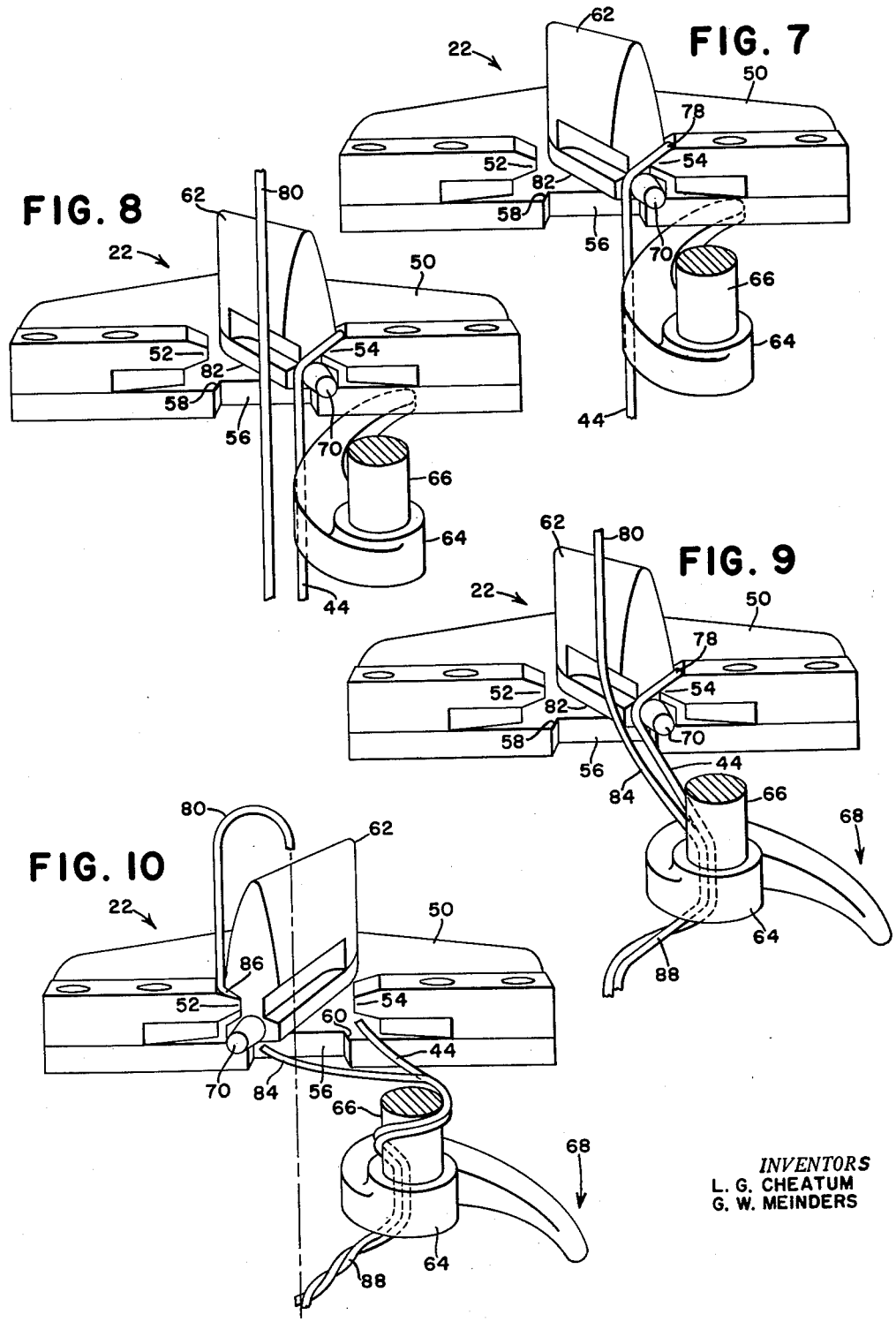

United States Patent Office 3,082,798
Patented Mar. 26, 1963

3,082,798
TYING MECHANISM
Leo G. Cheatum and Clarence W. Meinders, Ottumwa, Iowa, assignors to Deere & Company, Moline, Ill., a corporation of Delaware
Continuation of application Ser. No. 18,553, Mar. 30, 1960. This application Jan. 30, 1961, Ser. No. 85,630
3 Claims. (Cl. 140—115)

This invention relates to a tying mechanism and more particularly to a wire tier for handling agricultural bales. The present application is a continuation of copending application Ser. No. 18,553, filed March 30, 1960 and now abandoned.

The tying mechanism is basically of the type in which a wire is gripped in gripping means and extends thence around three sides of a bale to a needle or similar strand-feeding means which is ultimately operative to bring the wire up along the fourth side of the bale and back to the gripping means. This crosses the fourth wire with a portion of the first wire, and twister or other suitable tying mechanism operates to twist the crossed portions into a "knot," during which the wires are cut and released and a new wire brought up by the needle is gripped to form the start of the wire that again passes around three sides of a following bale. A typical tying mechanism employing this system is disclosed in assignee's copending application Ser. No. 709,346, filed January 16, 1958, now Patent No. 2,988,115. A characteristic of that mechanism is that the gripping means comprises a pair of laterally spaced apart abutments which afford a forwardly opening throat across which a gripper is alternately swingable to successively and cyclically grip and release wires as the tying mechanism operates. The tying element itself is in the form of a shaft rotatable on an axis normal to the plane of the throat across which the gripper moves, and this shaft carries a twister hook which at times is offset laterally from the throat so that when the gripper is in one position, the gripped wire extends diagonally across the throat and downwardly to the tier hook and thence around the bale. When the wire is brought up by the needle, it enters the throat and the hook is so designed that it twists the first wire and the needle wire together, and during the twisting cycle the gripper moves across the throat to release the first held wire and to cut and grip the second wire, or a portion of the second wire above the portion cut off to move out with the tied bale. When the needle returns to its down position and the next charge of hay is delivered by the plunger, the gripped portion of the second wire is brought downwardly past the twister hook to be ultimately received therein with the next needle wire when the twister hook makes one revolution in its next cycle, but, since the gripped wire is now laterally closer to the twister hook than the previously gripped wire, the relationship between the second set of wires and the hook is different from that of the previous set of wires, and it has been found that this difference rather seriously affects the tying operation, because alternate bales have knot characteristics different from those of every other bale tied during those phases of operation when the gripped wire was held between the gripper and the opposite abutment.

According to the present invention, this deficiency is eliminated by the provision of means for causing the wires to occupy the same relationship to the twister hook at all times. Specifically, this is accomplished by the provision of guide means in the form of a projection which changes the relationship of the second set of wires to the twister hook so that it is a substantial duplicate of the relationship occupied when wire is gripped by the gripper and the abutment that is more remote from the twister hook. In one form of the invention, the projection or guide means is carried by the moving gripper, and in another form of the invention the same or similar results are accomplished by mounting the guide means on the support means adjacent to the abutment that is closer to the twister hook, the guide means being so shaped and disposed as to project laterally toward the opposite abutment and, when the gripped wire is brought down, it will cause it to pass around the projection so that the gripped wire occupies substantially the same relationship as the wire held between the gripper and the more remote abutment. The inventive concept features the ability of both forms of the invention to be readily added to existing tying mechanisms.

The foregoing and other important objects and desirable features inherent in and encompassed by the invention will become apparent as the preferred embodiments are disclosed in detail in the ensuing description and accompanying sheets of drawings, the figures of which are described below.

FIG. 3 is a perspective view, on an enlarged scale, as seen generally in the direction of the arrow bearing the encircled numeral 3 in FIG. 1, illustrating the gripper, the gripped wire and the hook in what may be regarded as the starting position of the twisting mechanism.

FIG. 4 is a view similar to FIG. 3 but illustrating the additional or needle wire as seen generally in the direction of the arrow bearing the encircled numeral 4 in FIG. 2.

FIG. 5 shows the next stage in the tying operation in which the twister hook has made substantially one and one-quarter revolutions, having picked up both the gripped wire and the needle wire.

FIG. 6 shows substantially the completion of the tying operation, illustrating the change of the gripper means to grip the needle wire above a portion thereof which is cut and simultaneously releasing the previously gripped wire so that as the bale moves out of the bale case it will strip the "knot" from the hook.

FIG. 7 represents a stage following FIG. 6 in which the needle wire has now been brought across the bale case by the next succeeding charge of hay, this stage corresponding generally to FIG. 3 except that the gripper is now operating at the other side of the mechanism.

FIG. 8 shows a stage corresponding to FIG. 4 with, of course, the gripper at the side of the gripping mechanism shown in FIG. 7.

FIG. 9 corresponds to FIG. 5, but the position of the gripper is of course reversed.

FIG. 10 corresponds to FIG. 6, the gripper again being reversed.

Figure 11:
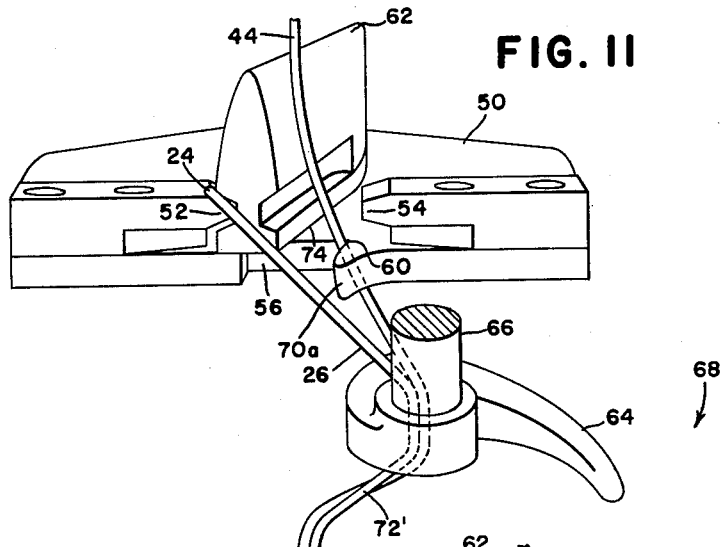

FIG. 11 illustrates a modified relationship between the gripper and the twister hook, this figure showing a situation comparable to FIG. 5 but of course employing the modified form.

Figure 12:
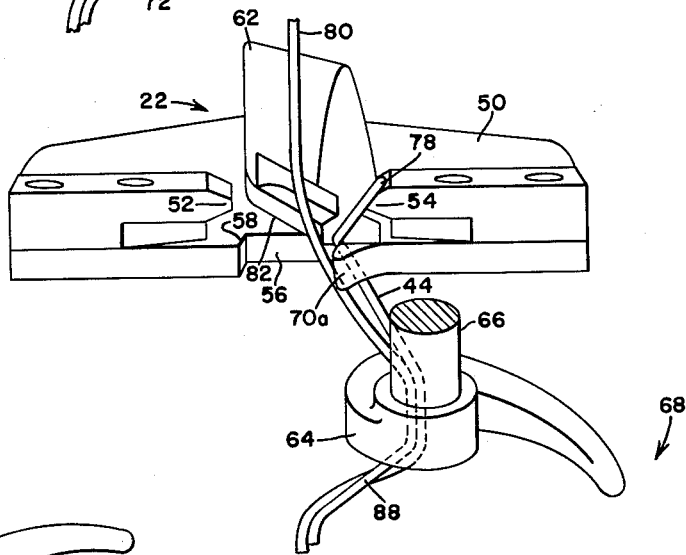

FIG. 12 illustrates the modified form in which the gripper has changed positions and in general corresponds to FIG. 9.

Figure 13:
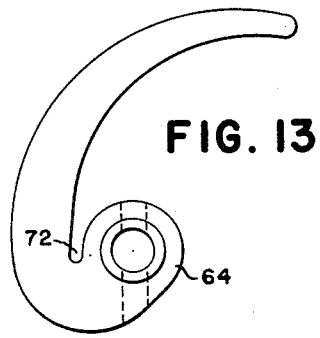

FIG. 13 is a plan view of the twister hook shown in its starting position relative to FIGS. 3 through 12.

Although the disclosure proceeds on the basis of the application of the invention to tying mechanism of the type using wire as the tying medium, it should be appreciated that tying media or strands of other types could be employed. Likewise, reference herein to the parts as occupying certain positional relationships is exemplary only and not limiting. In a typical baler, the tying mechanism will be mounted above the bale case as shown in FIGS. 1 and 2, but it is known to mount tying mechanism in other locations.

Figure 1:
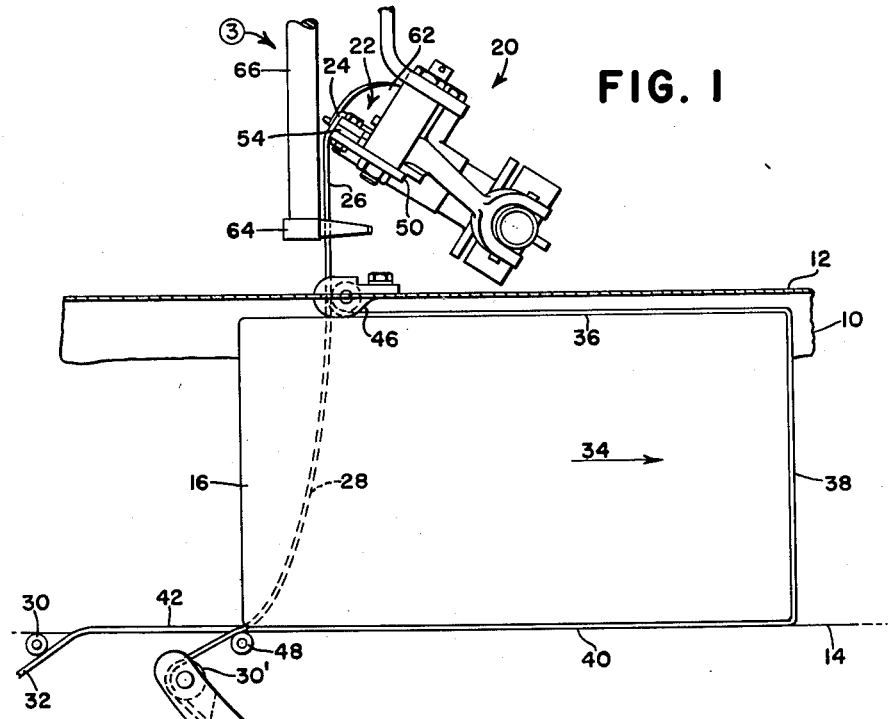
FIG. 1 is a sectional view showing a portion of the tying mechanism, a portion of a bale chamber and a stage in the bale-forming operation in which operation of the tying mechanism is about to be initiated, dotted lines being used to show how a wire first crosses the bale case.

In FIG. 1, the numeral 10 represents a bale case or chamber having a top wall 12 and a floor 14. The rectangle represented by the numeral 16 is a bale which, in FIG. 1, is substantially complete as to its compaction stage and the typical baling plunger is omitted from the views in the interest of clarity, but those familiar with the art know that such plunger is conventionally slotted to allow a conventional tying needle 18 to move upwardly for cooperation with tying mechanism, indicated in its entirety by the numeral 20.

This tying mechanism is mounted on any suitable structural part of the baler and, to the extent presently material, includes gripping means 22 which serves initially to grip one end 24 of a wire 26 which preliminarily extends across the bale case at 28 (dotted line) to the needle 18, passing thereat over a sheave 30 to extend at 32 to a source of supply (not shown). As the charges of hay accumulate, the wire portion or bight 28 is forced successively to the rear, or in the direction of the arrow 34, until the bale ultimately reaches the size shown here at 16. At that stage, the bale will then be encircled at three of its four sides by the wire, it being understood of course that the gripped portion 24 of the wire 26 remains fixed and the bale-encircling portions, as at 36, 38 and 40 will be drawn out from the source of supply. It should also be understood that one or more additional wires will be employed in the conventional baler, but the present description can proceed on the basis of one, since the other wires are handled by a duplication of the process to be presently described.

Figure 2:
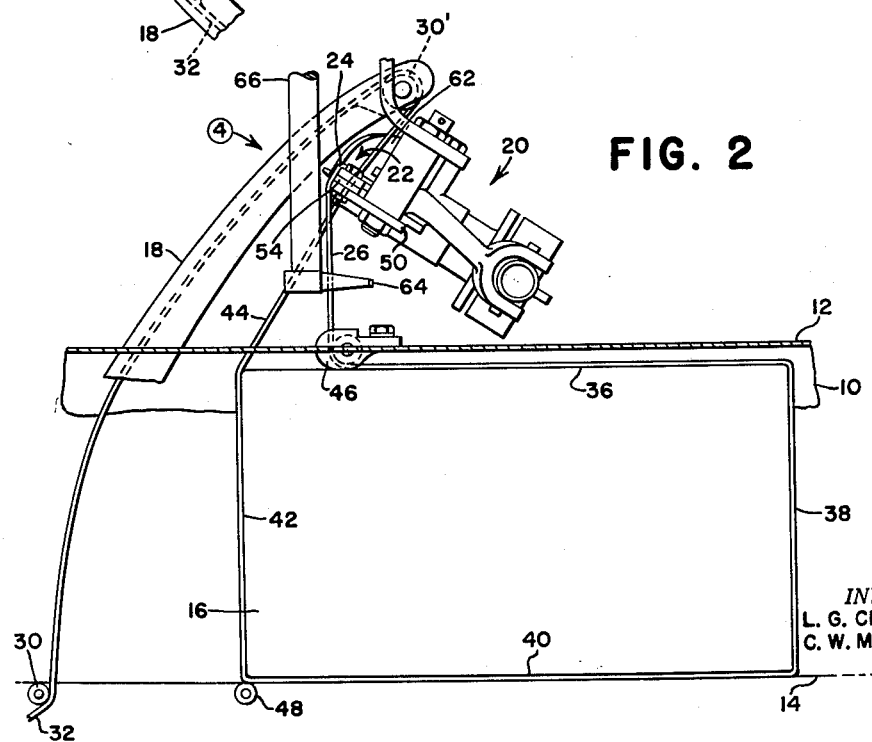
FIG. 2 is a similar view showing the tying needle occupying a position in which it has brought up the final bale-encircling wire.

When the bale 16 reaches the predetermined size, suitable timing or tripping mechanism, not shown here, trips needle drive mechanism (also not shown) to cause the needle to move from its position of FIG. 1 to its position of FIG. 2. When the needle moves to this position, it brings with it, via a needle sheave 30′, a fourth wire 42 for completing the encirclement of the bale 16, this wire extending upwardly over the upper front corner of the bale at 44 between that point and the sheave 30 on the needle. The portion 44 is then placed within the tying mechanism so that upon actuation thereof the portions 44 and 26 will be twisted together. By way of completing the description of FIGS. 1 and 2, reference should be had to a wire guide at 46 which guides the wire portion 26 to extend into the wire portion 36. Likewise, a guide 48 functions in similar fashion at the lower front corner of the bale as the wire portion 40 extends into the needle-carried wire 44—32.

The tying mechanism includes a support 50 which carries a pair of spaced apart fixed abutments 52 and 54, spaced at opposite sides of a central throat 56 which has its own opposite sides, respectively proximate to the abutments 52 and 54, establishing cutting edges 58 and 60. A gripper element 62 is selectively shiftable alternately back and forth between two positions, one of the positions being shown in FIGS. 3, 4 and 5 and the other of the positions being shown in FIGS. 6–9, with a return to the first position being shown in FIG. 10. In general, the tying mechanism operates on the principle of gripping one wire during the formation of the bale, bringing up the needle wire when the bale is completely formed, and then twisting the two wires together by a twisting medium in the form of a hook 64, rotatable with and on the axis of a vertical shaft 66. The hook has a static starting position represented essentially by FIGS. 3, 4 and 13, from which it may progress through, say, six revolutions; although, the particular number of revolutions is not material, that chosen as representative being the number of revolutions employed in a commercial embodiment of the present invention. The direction of rotation of the hook is represented by the arrow 68 in FIGS. 5, 6, 9 and 10.

Let it be assumed that FIGS. 1 and 3 represent a static situation just prior to operation of the tying mechanism. In this case, as already described, the end of the wire portion 26 will be gripped at 24, which occurs, as best seen in FIG. 3, because of the cooperation of the gripper and continues thence around the bale. The forward portion 26 extends downwardly to pass under the guide 26 and continues thence around the bale. The forward portion of the gripper element 62 has thereon guide means in the form of a forward projection or lug 70 over which the wire 24—26 passes as it extends downwardly to the bale. The wire portion 26 is clear of the static hook 64. As best shown in FIG. 13, the hook has therein a notch 72 which is of sufficient depth to receive two wires but the width of which is such as to receive only one wire; that is, the two wires cannot pass each other in this notch and therefore when two wires are received and the hook is rotated, the wires must necessarily be twisted together.

The next step in the tying operation will be movement of the needle from its FIG. 1 position to its FIG. 2 position, placing the wire 44 alongside the wire 26. This is illustrated in FIGS. 2 and 4, in the latter of which it will be noted that the wire 44 is to the right of the gripper 62. The twister hook 64 now starts turning, and during its first revolution picks up the two wire portions 26 and 44, and continues to rotate, at about this time forming a single twist at 72′ in the two wires between the upper lefthand corner of the bale and twister hook 64 (FIG. 5). At about this time, the gripper 62 begins to swing to the right, first releasing the gripped wire at 24 and immediately severing the wire 44 and gripping the wire portion 44 above the severed portion. Severing or cutting is accomplished as the lower right-hand edge of the gripper, as at 74, shears the wire 44 in conjunction with the cutting edge 60 previously described. This will leave the lower portion of the wire 44 with a free terminal end 76 (FIG. 6), the other wire 26 already being freed at 24, and as the twister hook continues through its successive revolutions, it will complete the twist at 72 into several turns of the wires 26 and 76. As the bale moves out after being tied, it will strip the wire from the hook and the hook will again assume its static position as shown in FIG. 7. In the meantime, the wire portion 44 has been gripped at 78 and extends thence upwardly in the form of a loop which is caused by the fact that the needle 18 has moved this wire previously upwardly and then has returned, leaving the wire, because of its own stiffness, in what may be regarded as an up position. However, the portion of the wire 44 between its gripped end at 78 and the needle sheave 30, when the needle is in its down position, will extend across the bale chamber just as the wire 28 did previously so that successive charges of hay will move this wire portion rearwardly until it again duplicates the wire portions 36, 38 and 40. FIG. 7 represents the wire 44, gripped at 78, extending across the bale case as a duplicate of the wire 28. The gripper 62 now remains at the right-hand side of the mechanism and the hook 64 is again stationary. When the next succeeding bale is completed, the tying mechanism is tripped and the needle brings up another wire, here designated 80, which is a repeat of the previous needle wire 44. However, in this case the wire 44 has taken the place of the previous wire 26. In any event, the situation is substantially duplicated, with the two wires 80 and 44 lying alongside each other and to the left of the twister hook. One significant difference may be noted between the phase of the tying operation as represented by FIGS. 3, 4 and 5 and that represented by FIGS. 7, 8 and 9. In the former phase, the wire 26 extending from its gripped end 24 down to the bale, is relatively remote from the axis of the twister hook. Hence, when the wire is picked up by the twister hook along with the wire 44 (FIG. 5) the angle thereof from the gripped portion 24 to the hook-received portion is substantially great. It is at this point that the significance of the lug or guide means 70 becomes evident, for it will be readily seen from FIGS. 7, 8 and 9 that without this lug, the wire 44, gripped at 78, would extend past the hook in relatively close proximity to the hook axis of rotation, thereby eliminating the angle that is so pronounced in FIG. 5. However, since the wire 44 must pass over the lug means 70, the angle is substantially duplicated when the wires 44 and 80 are picked up by the hook as in FIG. 9. In this figure, it will be seen that the positional aspect of the lug 70 is such that it projects not only forwardly but is also offset laterally from the abutment portion 54 in the direction toward the other abutment portion 52. As already stated, this causes the angle of the wire 44 between the lug 70 and the notch of the hook 64 to approximate that of the wire portion 26 in FIG. 5, and thus the operational characteristics of the tier mechanism will be substantially the same whether the wire is gripped to the left or to the right of the gripper element 62.

In the case of FIG. 9, as in the case of FIG. 5, the twister hook 64 makes slightly more than one revolution, followed by shifting of the gripper element 62 to the left, releasing the gripped wire 44 from its gripped situation at 78 and substantially immediately thereafter cutting the wire 80 by cooperation between the fixed cutting edge 58 and a cooperative cutting edge 82 on the left-hand side of the gripper 62. This severs the wire portion 80 into a lower portion 84 and an upper portion which is gripped at 86 (FIG. 10). In FIG. 9 a twist is beginning to be formed at 88 and in FIG. 10 this twist is multiplied in the wires 44 and 84 so as to complete a knot which is stripped when that bale moves out. The wire portion 80 then is the wire that extends upwardly and thence downwardly, having been brought up by the needle and the needle now having returned. The descending portion of the wire 80 will extend across the bale case as a duplicate of the wire 28 and the tying mechanism will again progress through the phases of FIGS. 3, 4, 5 and 6, followed by FIGS. 7, 8, 9, 10 and so on, the important thing being that when the gripper is to the right as seen in these drawings the angle between the gripped wire and hook is substantially the same as the angle between the gripped wire and the hook in the situation in which the gripper 62 is to the left.

In the modified form of the invention shown in FIGS. 11 and 12, the components may be regarded as the same as those already described and accordingly will bear the same reference characters, notably the support 50, having the abutments 52 and 54 with which the gripper 62 cooperates as it moves across the throat 56 to cooperate with the cutting edges 58 and 60. Again, the wire 26 is gripped at 24 as the gripper 62 occupies its leftward position, but FIG. 11 shows that stage which corresponds to FIG. 5; that is, the twister hook 64 is in slightly more than one revolution, having effected a twist at 72' between the wires 26 and 44, following which the gripper 62 swings to the right to sever the wire 44 as at 76 (FIG. 6) and to grip the wire 44 as at 78. In this case, the guide means or forward projection is shown as a lug 70a carried by the right-hand side of the throat 56, as a forward projection from the cutting edge 60. However, like the lug 70 in the right-hand position of the gripper 62 in the previous figures, the lug 70a is offset to the left from the abutment 54 and, as best seen in FIG. 12, the angle of the wire 44 substantially duplicates that of the wire 26 in FIG. 11, it being recognized that FIG. 12 is comparable to FIG. 9 in the stage of the tying operation. It will be further understood that the twister hook 64 completes its twisting cycle to complete the knot 88 so that ultimately the knot will appear as in FIG. 10 preliminary to the next phase in which the subsequent wire 80 is gripped at the left-hand side as at 86, followed by the laying of a new needle wire. Since the two forms of the invention perform in equivalent manners and otherwise produce the same beneficial results, elaboration of the operation of that form of the invention shown in FIGS. 11 and 12 is deemed to be unnecessary.

Features and advantages of the invention, in addition to those described, will readily occur to those versed in the art, as will modifications and alterations in the preferred embodiments disclosed, all of which may be achieved from departure from the spirit and scope of the invention.

What is claimed is:

1. In tying mechanism of the type including a support member having a throat including opposite sides and a forward opening and bordered at said opposite sides respectively by first and second spaced apart abutments and first and second cutting edges respectively proximate to said first and second abutments, a gripper member movable cyclically across and above the throat to cooperate respectively with the abutments for alternately gripping and releasing first and second tying strands and said gripper having first and second opposite cutting edges respectively cooperative with said first and second cutting edges incident to gripping of said strands, and a tying element below the throat and having a forwardly opening strand-receiving notch including a portion offset laterally of the throat so as to lie at times relatively laterally remote from the first abutment and relatively laterally closer to the second abutment so that a first strand gripped against the first abutment extends across the throat and to said notch portion in a certain downward and lateral position, the improvement comprising guide means on one of said members in addition to and independent of said cutting edges and projecting from said one member forwardly beyond the forward opening of said throat and operative when a second strand is gripped between the gripper member and the second abutment to afford a forward projection offset laterally from the second abutment and toward the first abutment for causing the gripped second strand to pass around said projection and thence back across the throat and to the notch portion in substantial duplication of the aforesaid downward and lateral position of the formerly gripped first strand.

2. The invention defined in claim 1, in which: said projection is carried by and projects forwardly from the gripper member.

3. The invention defined in claim 1, in which: said projection is carried by the support member at the side of the throat adjacent to said second abutment and extends partly across the throat toward the first abutment.

References Cited in the file of this patent

UNITED STATES PATENTS 2,988,115    Cheatum    June 13, 1961